United States Patent Office 3,835,104
Patented Sept. 10, 1974

---

3,835,104
CURABLE, AMORPHOUS, OLEFINIC TERPOLY-
MERS FROM ALPHAMONO OLEFINS AND
POLYENES
Sebastiano Cesca, Sergio Arrighetti, and Walter Marconi,
San Donato Milanese, Italy, assignors to Snam Progetti
S.p.A., Milan, Italy
No Drawing. Original application Sept. 5, 1969, Ser. No.
855,771, now Patent No. 3,652,514. Divided and this
application Mar. 20, 1972, Ser. No. 236,249
Claims priority, application Italy, Sept. 5, 1968,
20,868/68, Patent 843,706
The portion of the term of the patent subsequent to
Mar. 28, 1989, has been disclaimed
Int. Cl. C08f 15/40
U.S. Cl. 260—80.78  10 Claims

ABSTRACT OF THE DISCLOSURE

A curable amorphous olefinic terpolymer of two different alpha-olefins having up to 10 carbons atoms and a polycyclic polyene, such as 4,7 endomethylene-4, 7-dihydroindene, which contains an endomethylene group ortho-condensed with a hydrocarbon ring, the two carbon atoms common to two rings being part of a conjugated diene system the double bonds of which are in the ring other than that containing the endomethylene group, is disclosed.

---

This is a division of application Ser. No. 855,771, filed Sept. 5, 1969 now Pat. No. 3,652,514.

This invention relates to curable amorphous terpolymers and to processes for preparing the same.

It is known to prepare terpolymers of ethylene, propylene or another alpha-olefin, and dicyclopentadiene or a similar compound containing a double bond in the endomethylene group of a first ring and another in a ring ortho-condensed with the first ring. It has, however, been observed that these terpolymers, although showing a high utilization of the diene monomer and very good characteristics as regards stability to active chemical agents, particularly to ozone and atmospheric agents, on account of their low degree of unsaturation nevertheless suffer from the disadvantage of having only a moderate rate of vulcanization.

Furthermore, vulcanization continues ad infinitum, i.e. without having a real end. This phenomenon is known in the art as a "marching modulus," and it adversely affects the properties of the terpolymer and limits its utilization since, besides affecting the characteristics of the polymer, it prevents or discourages covulcanization with other known elastomers having a high curing rate.

It is therefore an object of the present invention to provide a terpolymer in which these disadvantages are absent or reduced.

According to one aspect of the present invention, there is provided a curable, amorphous olefinic terpolymer of two different alpha-olefins having up to 10 carbon atoms, and a polycyclic polyene containing an endomethylene group ortho-condensed with a hydrocarbon ring, the two carbon atoms common to two rings being part of a conjugated diene system the double bonds of which are in the ring other than that containing the endomethylene group.

It has now been found that the vulcanization rate of the terpolymer according to the present invention is often over 100% greater than that of a corresponding terpolymer containing dicyclopentadiene as the termonomer.

Examples of suitable alpha-olefins include ethylene, propylene, butenes, pentenes, methyl-pentenes and hexenes. Preferably, the α-olefin pair is a mixture of ethylene and propylene.

Examples of suitable polycycle olefins include the following compounds, the formula of which is shown below:

(I) Dehydrodicyclopentadine of 4,7 endomethylene-4,7-dihydroindene;
(II) 5,8 - endomethylene-2,3,5,8-tetrahydronaphthalene;
(III) 2,3 - dimethyl - 5,8-endomethylene-2,3,5,8-tetrahydronaphthalene;
(IV) 2,4-dimethyl-4,7-endomethylene-4,7-dihydroidene;
(V) 1,3-dimethyl-4,7-endomethylene-4,7-dihydroindene;
(VI) 1-methyl-4,7-endomethylene-4,7-dihydroindene;
(VII) 1,2,3,4 - tetramethyl - 4,7-endomethylene-4,7-dihydroindene; and
(VIII) 1,4 - dimethyl - 5,8 - endomethylene-2,3,5,8,-tetrahydronaphthalene.

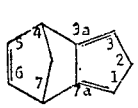 (I)  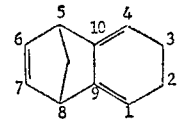 (II)

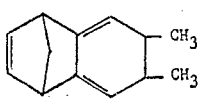 (III)  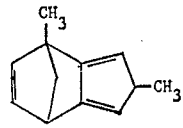 (IV)

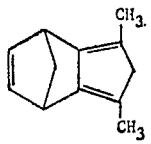 (V)  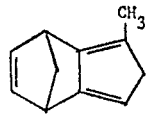 (VI)

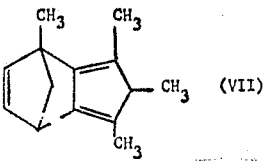 (VII)  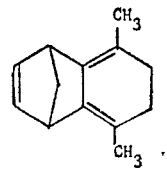 (VIII)

The terpolymers of the present invention may be prepared in accordance with another aspect of the present invention, by a process which comprises polymerizing a mixture of the two different alpha-olefins and the ortho-condensed polycyclic polyene in the presence of a polymerization catalyst.

In one embodiment of the present invention, the polymerization catalyst comprises a compound of a transition metal of Groups IV and VIII of the Periodic Table and an aluminum compound having the formula $AlR^1X^1X^2$ wherein $R^1$ is a hydrogen atom or an alkyl group having from 1 to 10 carbon atoms, and each of $X^1$ and $X^2$, which may be the same or different, is a hydrogen atom, a halogen atom, an alkyl group having from 1 to 10 carbon atoms or a secondary amine group.

Examples of the aluminum compound include:

Al(n-$C_{10}H_{21}$)$_3$
Al(n-$C_6H_{13}$)$_3$
Al(n-$C_4H_9$)$_3$
$AlCl_2(C_2H_5)$
$Al(C_2H_5)_2Cl$
$Al(i-C_4H_9)_2Cl$
$Al(i-C_4H_9)Cl_2$
$AlHCl_2 \cdot O(C_2H_5)_2$
$AlH_2N(CH_3)_2$
$AlHClN(CH_3)_2$ and
$AlH_3 \cdot N(CH_3)_3$.

In an alternative embodiment, the polymerization catalyst comprises a compound of a transition metal of Groups IV to VIII of the Periodic Table and an aluminum compound which is a polyimino-alane. Preferably the polyimino-alane contains in its molecule groups having the formula

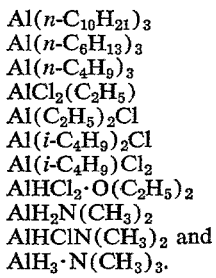

wherein R represents an alkyl, aryl or cycloalkyl hydrocarbon radical.

Generally, the transition metal compound is $VCl_4$, $VOCl_3$, vanadium triacetylacetonate, $VClO(OC_2H_5)_2$, $VCl_3 \cdot 3THF$ or $TiCl_4$.

The polymerization reaction may be carried out in the presence of an inert hydrocarbon solvent, or the α-olefins, when liquid, can act as a solvent.

The catalyst may be preformed in the presence or absence of one monomer, or may be formed "in situ." The temperatures employed are those usually employed in this kind of reaction and are generally in the range from —60° to +100° C. The pressure employed is that between the pressure necessary to maintain, at least partially, the monomers in the liquid phase and 100 atmospheres preferably from 1 to 80 atmospheres.

When the two α-olefin monomers are ethylene and propylene the preferred ratio between these two monomers is in the range from 1:4 to 4:1, preferably from 1.5:1 to 1:1.5. Generally, the polyene content is from 1 to 20%.

The present invention is now illustrated by the following Examples. Examples 2, 4, 6 are included for comparative purposes only. In the Examples, the course of the vulcanization reaction is studied by the torque measured on a Zwick type oscillating plate rheometer during the vulcanization. The torque is proportional to the degree of vulcanization. It is assumed that the maximum variation of the torque is the difference between the torque measured after the first 250 minutes of vulcanization, and the torque initially measured, i.e. $G_{250} - G_{min} = G_{max}$; furthermore, it is assumed that the concentration of double bonds at a time $t$ is $G_{250} - G_t$, i.e. the difference between the assumed maximum torque and the torque at time $t$.

The vulcanization rates, measured under the specified conditions, with a sulphur excess, depend substantially only on the concentration of double bonds.

The course of the vulcanization satisfies a kinetic equation of the second order, which may be expressed as follows:

$$\frac{dGt}{dt} = K(G_{max} - G_t)^2$$

From this it is possible to evaluate the vulcanization rate constant K, once $G_{max}$ and $t_{50}$, which is the time required to obtain 50% of $G_{max} - G_{min}$, are known, using the following equation:

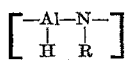

EXAMPLE 1

1000 ml. of n-hexane were introduced in an inert atmosphere into a 1500 ml. tubular reactor fitted with a mechanical stirrer, a thermometer sheath and a jacket for a thermostatically controlled fluid. At the same time, a propylene-ethylene mixture having a molar ratio of 2:1 was fed to the bottom of the reactor at a flow rate of 1200 litres (measured under standard conditions) per hour. In order to facilitate the attainment of the saturation equilibrium, the solvent was stirred while the gas was introduced, and the temperature of the solvent was kept at —20° C. by circulating in the reactor jacket a cooling mixture controlled by a cyrostat.

After the monomer mixture had been blown in for 20 minutes, the equilibrium was assumed to have been attained. Into the reactor were then introduced 2.4 mmoles/l. of $(C_2H_5)_2AlCl$, 1.2 mmoles/l. of anisole and 7.5 mmoles/l. of dehydrodicyclopentadiene. The stream of the gaseous mixture of monomers was continued, and the polymerization reaction was primed by introducing 0.4 mmole of $VCl_4$. The polymerization continued for 4 minutes after which it was stopped by introducing into the reactor 1 ml. of n-butanol. The reaction solution was washed with water acidified by HCl and again with water until it was neutral to litmus, after which it was coagulated by a slow addition of an excess of acetone to which the amine antioxidant AO-4010 had been added.

The resulting product was dried at a reduced pressure and at 50° C. for 15 hours, and the elastomer which was obtained, which appeared similar to uncured rubber, weighed 18.3 g. When examined with X-rays, it proved to be essentially amorphous, and showed an ethylene content of 61% by weight, and its intrinsic viscosity, measured in toluene at 30° C. was found to be 2.75 dl./g. The iodometric test indicated a termonomer content of 2.45% by weight.

A fraction of the terpolymer which was obtained was subjected to curing in an oscillating plate Zwick rheometer with an angle twist $a = 1.51$, using the following formulation:

| | Parts by weight |
|---|---|
| Polymer | 100 |
| HAF Black (carbon) | 50 |
| ZnO | 5 |
| Circosol 4240 | 5 |
| MBT (MBT=mercaptobenzothiazole) | 0.5 |
| TMTD (TMTD=tetramethyl-thiuram disulphide) | 1 |
| Sulphur | 2 |

Temperature of vulcanization=145° C.
The following results were obtained:

$t_1 = 2'45''$ (induction time);
$t_{50} = 2'15''$; $t_{70} = 3'15''$; $t_{90} = 5'15''$ (where $t_{50}$, $t_{70}$ and $t_{90}$ are the times necessary to obtain 50, 70 and 90%, respectively, of the maximum torsion modulus;
$K = 2.540$ min.$^{-1} \cdot m^{-1} \cdot kg.^{-1}$, where K is the rate constant for the whole vulcanization reaction; and
$G_{max} = 0.410$ m·kg., where $G_{max}$ is the maximum torque registered at the end of the vulcanization.

EXAMPLE 2

The procedure of Example 1 was repeated except that dicyclopentadiene was used as the termonomer. A terpolymer was obtained which showed a viscosity of 2.16 dl./g. and a termonomer content of 2.53%; after vulcanization, the following results were calculated:

$t_1 = 7$ minutes; $t_{50} = 32'$; $t_{70} = 60'$; $t_{90} = 121'$;
$K = 0.100$ min.$^{-1} \cdot m^{-1}$, kg.$^{-1}$; and $G_{max} = 0.345$ m·kg.

EXAMPLE 3

The procedure described in Example 1 was repeated except that 1.8 mmoles/l. of $(C_2H_5)_2AlCl$, 0.9 mmoles/l. of anisole, 0.3 mmole/l. of $VCl_4$ and 15.0 mmoles/l. of 5,8 - endomethylene - 2,3,5,8 - tetrahydronaphthalene dissolved in 25 ml. of toluene were used. The other monomers were as in Example 1.

The termonomer was added at regular intervals during the 8 minutes of polymerization and, at the end of the reaction, 25.0 g. of an elastomer were obtained, which contained 61% by weight of $C_2H_4$ and 4.9% of the termonomer and which has a viscosity of 2.29 dl./g. After vulcanization in the Zwick rheometer, the following data were obtained:

$t_i=1'45''$; $t_{50}=4'$; $t_{70}=7'$; $t_{90}=10'$;
$K=0.927$ min.$^{-1}$·m$^{-1}$·kg.$^{-1}$; and $G_{max}=0.520$ m·kg.

EXAMPLE 4

The procedure of Example 3 was repeated, except that as the termonomer there was employed 5,8-endomethylene-1,4,5,8,9,10-hexahydronaphthalene. A polymer was obtained which had a viscosity of 2.32 dl./g. and a termonomer content of 5.01%. After vulcanization, the following measurements were obtained:

$t_i=8$ minutes; $t_{50}=35'$; $t_{70}=65'$; $t_{90}=135'$;
$K=0.076$ min.$^{-1}$·m$^{-1}$·kg.$^{-1}$; and $G_{max}=0.418$ m·kg.

EXAMPLE 5

The procedure of Example 1 was repeated, except that there were introduced into the reactor, which was maintained at 0° C., 3.0 mmoles/l. of $(C_2H_5)_2AlCl$, 10.6 mmoles/l. of 1,3-dimethyl - 4,7-endomethylene - 4,7-dihydroindene and 0.5 mmole/l. of vanadium-tri-acetylacetonate.

The polymerization was carried out for 9 minutes, during which time the termonomer, which was diluted in 25 ml. of toluene, was added at regular intervals: at the end of the polymerization 32.5 g. of an elastomer were obtained, which had a $C_2H_4$ content of 52% by weight, a termonomer content of 3.20% and a viscosity of 3.78 dl./g. After vulcanization following the procedure described in Example 1, the following results were obtained:

$t_i=2'30''$; $t_{50}=3'$; $t_{70}=4'$; $t_{90}=7'$;
$K=1.045$ min.$^{-1}$·m$^{-1}$·kg.$^{-1}$; and $G_{max}=0.343$ m·kg.

EXAMPLE 6

The procedure described in Example 5 was repeated except that dicyclopentadiene was used as the termonomer. An elastomer was obtained which had a viscosity of 1.20 dl./g. and a termonomer content of 4.51%. After vulcanization using the Zwick rheometer, the following data were obtained:

$t_i=5$ minutes; $t_{50}=18'$; $t_{70}=39'45''$; $t_{90}=101'30''$;
$K=0.128$ min.$^{-1}$·m$^{-1}$·kg.$^{-1}$; and $G_{max}=0.488$ m·kg.

Comparison of Examples 1, 3 and 5 with Examples 2, 4 and 6, respectively, clearly shows the improved rate of curing obtained with these terpolymers of the present invention.

The present invention also provides an elastomeric material comprising a curable or cured terpolymer according to the present invention.

What we claim is:

1. A process for preparing a curable, amorliphous olefinic terpolymer of two different alpha-olefins having up to 10 carbon atoms, and a polycyclic polyene containing an endomethylene group orthocondensed with a hydrocarbon ring, the two carbon atoms common to two rings being part of a conjugated diene system the double bonds of which are in the ring other than that containing the endomethylene group, said process comprising polymerizing a mixture of said two different alpha-olefins and said orthocondensed polycyclic polyene in the presence of a polymerization catalyst which comprises a compound of a transition metal of Groups IV to VIII of the Periodic Table and an aluminum compound having the formula $AlR^1X^1X^2$ wherein $R^1$ is a hydrogen atom or an alkyl group having from 1 to 10 carbon atoms, and each of $X^1$ and $X^2$, which may be the same or different, is a hydrogen atom, a halogen atom, an alkyl group having from 1 to 10 carbon atoms or a secondary amine group to form said curable amorphous olefinic terpolymer.

2. Process according to claim 1, wherein the aluminum compound is one selected from the group consisting of $Al(n-C_{10}H_{21})_3$
$Al(n-C_6H_{13})_3$
$Al(n-C_4H_9)_3$
$AlCl_2(C_2H_5)$
$Cl(C_2H_5)_2Cl$
$Al(i-C_4H_9)_2Cl$
$Al(i-C_4H_9)Cl_2$
$AlHCl_2.O(C_2H_5)_2$
$AlHCl_2.N(C_2H_5)_2$
$AlH_2N(CH_3)_2$
$AlHClN(CH_3)_2$ and
$AlH_3.N(CH_3)_3$ 3. Process according to Claim 1, wherein the polymerization catalyst comprises a compound of transition metal of Groups IV to VIII of the Perodic Table and an aluminum compound which is a polyimino-alane.

4. Process according to Claim 3, wherein the polyimino-alane contains in its molecule groups having the formula

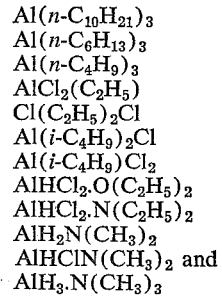

wherein R represents an alkyl, aryl or cycloalkyl hydrocarbon radical.

5. Process according to Claim 1, wherein the transition metal compound is $VCl_4$, $VOCl_3$, vanadium triacetylacetonate, $VClO(OC_2H_5)_2$, $VCl_3.3THF$ or $TiCl_4$.

6. Process according to Claim 1, wherein the polymerization is effected in the presence of an inert solvent.

7. Process according to Claim 1, wherein the polymerization is effected at a pressure of up to 100 atmospheres.

8. Process according to Claim 7, wherein the polymerization is effected at a pressure of from 1 to 80 atmospheres.

9. Process according to Claim 1, wherein the polymerization is effected at a temperature of from −60 to +100° C.

10. Process according to Claim 1, wherein further comprises vulcanizing the curable amorphous terpolymer.

References Cited
UNITED STATES PATENTS 3,211,709  10/1965  Adamek et al. _____ 260—80.78
3,470,138   9/1969  Marconi et al. _____ 260—80.78
3,652,514   3/1972  Cesca _____ 260—80.78

JOSEPH L. SCHAFER, Primary Examiner

E. J. SMITH, Assistant Examiner

U.S. Cl. X.R.
260—79.5 B

UNITED STATES PATENT OFFICE
CERTIFICATE OF CORRECTION

PATENT NO. : 3,835,104
DATED : September 10, 1974
INVENTOR(S) : Sebastiano Cesca, Sergio Arrighetti, Walter Marconi It is certified that error appears in the above-identified patent and that said Letters Patent are hereby corrected as shown below:

Claim 1, line 1, change "amorliphous" to -- amorphous --.

Claim 3, line 2, before "transition" insert -- a --.

Signed and Sealed this twenty-ninth Day of July 1975

[SEAL]

Attest:

RUTH C. MASON
*Attesting Officer*

C. MARSHALL DANN
*Commissioner of Patents and Trademarks*